US012792338B2

(12) United States Patent
Stavesand et al.

(10) Patent No.: US 12,792,338 B2
(45) Date of Patent: Nov. 10, 2026

(54) COMPUTER-IMPLEMENTED METHOD FOR THE AUTOMATED TESTING AND RELEASE OF VEHICLE FUNCTIONS

(71) Applicant: dSPACE GmbH, Paderborn (DE)

(72) Inventors: Jann-Eve Stavesand, Paderborn (DE); Robert Timmermann, Paderborn (DE); Jan Hendrik Hammer, Paderborn (DE)

(73) Assignee: dSPACE GmbH, Paderborn (DE)

( * ) Notice: Subject to any disclaimer, the term of this patent is extended or adjusted under 35 U.S.C. 154(b) by 271 days.

(21) Appl. No.: 18/608,232

(22) Filed: Mar. 18, 2024

(65) Prior Publication Data

US 2024/0220233 A1 Jul. 4, 2024

Related U.S. Application Data

(63) Continuation of application No. PCT/EP2022/073880, filed on Aug. 29, 2022.

(30) Foreign Application Priority Data

Sep. 23, 2021 (DE) ..................... 10 2021 124 634.2

(51) Int. Cl.

| | |
|---|---|
| ***G06F 8/65*** | (2018.01) |
| ***B60W 50/00*** | (2006.01) |
| ***B60W 50/04*** | (2006.01) |
| ***G06F 11/34*** | (2006.01) |

(52) U.S. Cl.

CPC ........... *G06F 8/65* (2013.01); *B60W 50/0098* (2013.01); *B60W 50/045* (2013.01); *G06F 11/3457* (2013.01); *B60W 2050/046* (2013.01)

(58) Field of Classification Search

CPC .. G06F 8/65; G06F 11/3457; B60W 50/0098; B60W 50/045; B60W 2050/045

USPC .................................. 717/120–140, 168–174

See application file for complete search history.

(56) References Cited

U.S. PATENT DOCUMENTS

| | | | | |
|---|---|---|---|---|
| 9,715,711 | B1 * | 7/2017 | Konrardy | G06Q 40/08 |
| 9,963,003 | B2 * | 5/2018 | Schneider | B60C 23/0401 |
| 10,049,328 | B2 | 8/2018 | Jiang et al. | |
| 10,697,790 | B2 | 6/2020 | Sumizawa | |
| 10,843,689 | B2 | 11/2020 | Jiang et al. | |

(Continued)

FOREIGN PATENT DOCUMENTS

| | | | |
|---|---|---|---|
| DE | 102017200180 | A1 | 7/2018 |
| JP | H06227280 | A | 8/1994 |

(Continued)

OTHER PUBLICATIONS

Sawarkar, “AI Driven Predictive Functional Safety leveraging Key Performance Indicators in Autonomous Vehicles”, IEEE, pp. 1-9 (Year: 2024).*

(Continued)

*Primary Examiner* — Anil Khatri

(74) *Attorney, Agent, or Firm* — Muncy, Geissler, Olds & Lowe, P.C.

(57) ABSTRACT

Provided is a computer-implemented method for the automated testing of functions, in particular safety functions, integrated into an end-to-end process from data collection in the vehicle to updating the driving function back into the vehicle and/or virtual homologation of at least partially autonomous driving functions to be tested.

15 Claims, 4 Drawing Sheets

(56) References Cited

U.S. PATENT DOCUMENTS

| | | | | |
|---|---|---|---|---|
| 11,030,364 | B2 * | 6/2021 | Sholingar | G06F 30/15 |
| 11,364,927 | B2 * | 6/2022 | Wolff | B60W 50/085 |
| 11,420,645 | B2 * | 8/2022 | Vardharajan | B60W 50/10 |
| 11,480,436 | B2 * | 10/2022 | Beaurepaire | G01C 21/3885 |
| 11,897,494 | B2 | 2/2024 | Dueser et al. | |
| 11,960,292 | B2 * | 4/2024 | Nayhouse | B60W 30/095 |
| 11,993,214 | B2 * | 5/2024 | Schadow | B60K 35/28 |
| 12,014,424 | B2 * | 6/2024 | Halder | G06Q 40/08 |
| 12,430,236 | B2 * | 9/2025 | Muehlenstaedt | G06F 11/368 |
| 2019/0155291 | A1 | 5/2019 | Heit et al. | |

FOREIGN PATENT DOCUMENTS

| | | | |
|---|---|---|---|
| JP | H0717298 | A | 1/1995 |
| JP | 2009-64088 | A1 | 3/2009 |
| JP | 2009-248909 | A | 10/2009 |
| JP | 2018-63703 | A | 4/2018 |
| JP | 2020-9428 | A | 1/2020 |
| JP | 2020-535061 | A | 12/2020 |
| WO | WO2015/190212 | A1 | 12/2015 |

OTHER PUBLICATIONS

Pereira et al., “AI Driven Predictive Functional Safety leveraging Key Performance Indicators in Autonomous Vehicles”, ACM, pp. 1-8 (Year: 2012).*

Changalvala et al, “LiDAR Data Integrity Verification for Autonomous Vehicle”, IEEE, pp. 1-14 (Year: 2019).*

Rajabli et al, “Software Verification and Validation of Safe Autonomous Cars: A Systematic Literature Review”, IEEE, pp. 1-23 ( Year: 2020).*

Pan et al, “Simulation-based Safety Assessment of Vehicle Characteristics Variations in Autonomous Driving Systems”, ACM, pp. 1-30 (Year: 2026).*

International Search Report dated Nov. 10, 2022 in corresponding application PCT/EP2022/073880.

Gagliardi, D. et al: “Outcome oriented evaluation of autonomous driving functions” 2018 IEEE Conference on Decision and Control, Miami Beach, FL, Dec. 17-19, 2018, pp. 6970-6975.

* cited by examiner

FIG. 5
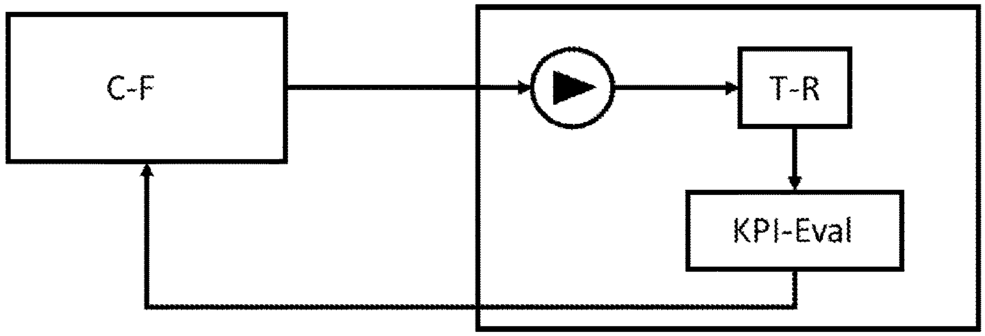
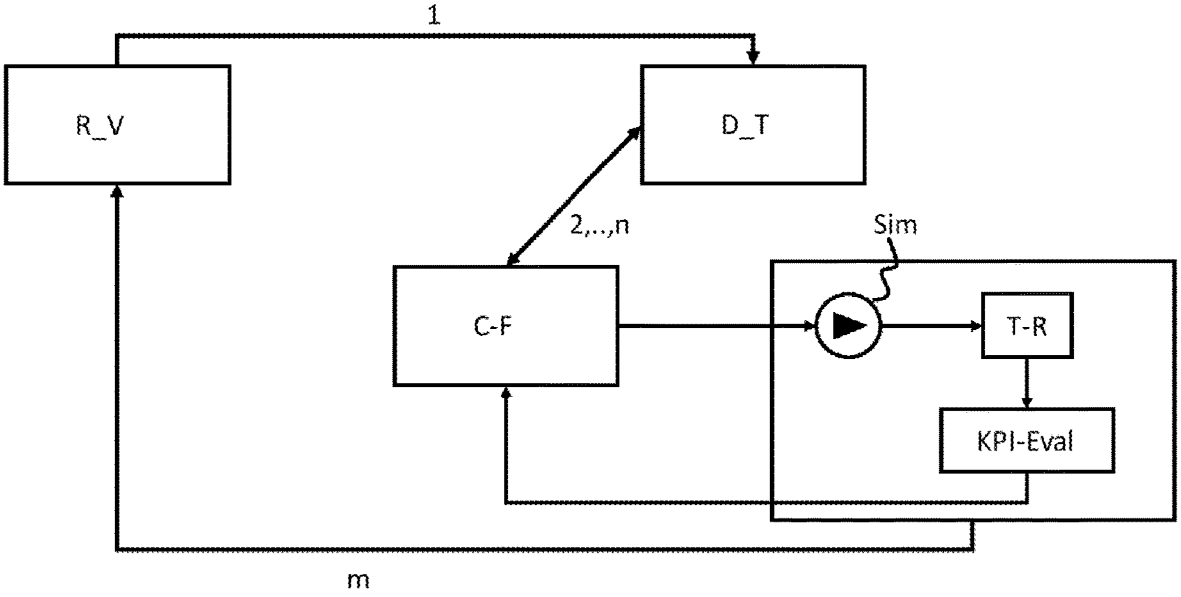
FIG. 6

COMPUTER-IMPLEMENTED METHOD FOR THE AUTOMATED TESTING AND RELEASE OF VEHICLE FUNCTIONS

This nonprovisional application is a continuation of International Application No. PCT/EP2022/073880, which was filed on Aug. 29, 2022, and which claims priority to German Patent Application No. 10 2021 124 634.2, which was filed in Germany on Sep. 23, 2021, and which are both herein incorporated by reference.

BACKGROUND OF THE INVENTION

Field of the Invention

The present invention relates to a computer-implemented method for the automated testing and release of functions, in particular safety functions, integrated into an end-to-end process from data collection in the vehicle to updating the driving function back into the vehicle and/or virtual homologation of at least partially autonomous driving functions to be tested.

Furthermore, the present invention relates to a test unit for the automated testing and release of functions, in particular safety functions, of a vehicle and/or virtual homologation of at least partially autonomous driving functions to be tested, and to a computer program and to a computer-readable data carrier.

Description of the Background Art

Vehicles are currently tested and approved as a unit comprising hardware and software components. Driving assistance systems such as, e.g., adaptive cruise control and/or functions for highly automated or autonomous driving can be verified or validated using various verification methods. In this regard, in particular, hardware-in-the-loop (HIL) methods, model-in-the-loop (MIL) methods, software-in-the-loop (SIL) methods, simulations, and/or test drives can be used. XIL (X-in-the-loop) methods are desirable in this regard, where the X denotes a model, software, or hardware of a control and regulation system under test. XIL strives for a seamless transition between MIL, SIL, HIL, and physical environments through the reuse of models, tests, data, and tools.

A subsequent modification of the vehicle software, therefore, a driving function, requires an assessment of the homologation relevance and, in the case of such, an approval supplement. At the same time, safety concerns arise regarding the modification of safety-relevant vehicle components/driving functions due to the subsequent modification. As a result, such changes for safety-critical components are typically provided only as part of recall campaigns and workshop visits. Apart from this, developmental advances are incorporated only into new vehicle generations, which in turn remain on the market for an average of 10 years.

Thanks to the data already available from vehicles in a real driving operation, there is great potential to use these data for further optimization and homologation and, in particular, for a virtual homologation.

The effort, in particular the time and/or cost, for testing such vehicle functions using the above-mentioned verification methods is typically very high, because a large number of potentially possible driving situations must be tested.

Testing an at least partially autonomous means of transport/vehicle subsequently for optimization exclusively on the road with travel distances of over billions of kilometers is not possible for reasons of time and cost. In addition, many redundant test kilometers would arise, whereas critical and unusual situations relevant to the capabilities of the at least partially autonomous vehicle, however, would not occur.

This can lead to a high effort for test drives as well as for simulations. DE 10 2017 200 180 A1 provides a method for verifying and/or validating a vehicle function intended for autonomously guiding a vehicle in the longitudinal and/or lateral direction.

The method comprises determining, on the basis of environmental data relating to an environment of the vehicle, a test control instruction of the vehicle function to an actuator of the vehicle, wherein the test control instruction is not implemented by the actuator.

The method further comprises simulating, on the basis of environmental data and using a road user model regarding at least one road user in the environment of the vehicle, a fictitious traffic situation that would exist if the test control instruction had been implemented.

The method further comprises providing test data related to the fictitious traffic situation. The vehicle function is operated passively here in the vehicle to determine the test control instruction.

A disadvantage of this method is that an actual operation of the vehicle is required for the verification and/or validation of the vehicle function in order to determine the required data and a release of the driving function is not part of the method.

The present invention starts after a first release for a vehicle has taken place and initial vehicle data can be collected on the regular operation of the vehicle. However, the process of renewed release of a modified driving function should be efficient and resource-saving. Therefore, the invention uses collected data from the previous operation of the vehicle and defines a sufficient homologation of the optimized driving function through fully virtual and/or partially virtual and/or real tests.

Because of significant changes and the rapid pace of development, the sale of an original vehicle implies more than ever before the simultaneous provision of continuous services for the operation, maintenance, and further development of vehicle systems that have already been delivered. Because of the growing range of functions in modern vehicles and the associated complexity, the number of subsequent modifications to vehicles in operation will continue to increase. This increasing interlinking of different phases and their further development of the product life cycle represents a significant challenge for automotive manufacturers. Innovative approaches to the continuous development of highly complex digital systems are needed to master this challenge.

It is foreseeable that the widely practiced approach to data collection and driving function development and delivery represents a significant obstacle to innovation. Due to their limited capacities and high costs, dedicated test drives can only reproduce a comparatively small proportion of relevant traffic situations. As a result, they do not provide a sufficient basis for data-driven driving function development. Simulations and synthetically generated data sets can compensate for these shortcomings, but are subject to a certain degree of uncertainty with regard to representativeness and fidelity to the original. For an effective and efficient solution, relying on productive, growing vehicle fleets is essential. For the majority of established car manufacturers, these represent a still underutilized resource, although a well-structured use of this potential must lead to clear competitive advantages in the medium to long term.

This requires intelligent test creation and readjustment, which makes driving data from real driving operations usable, transfers them to test procedures, and evaluates, e.g., simulation results and, if necessary, undertakes a modified parameterization of the tests/simulation.

SUMMARY OF THE INVENTION

It is therefore the object of the invention to provide a method, a test unit, a computer program, and a computer-readable data carrier which generate an automated testing of functions on the basis of real vehicle data, a suitable test environment, and tests/simulations. The high degree of automation of this test execution in parallel with the operation of the vehicle fleet with (partially) automated driving functions and the continuous review of safety criteria of this fleet in a simulated environment (digital twin/digital behavioral twin) enable here for the first time the release and virtual homologation of driving functions based on simulation methods, such as XIL and reprocessing, of a regeneration of existing data sets. The digital behavioral twin is automatically created and parameterized according to the test task of the driving function (software or electronic function) and the necessary release-relevant tests (e.g., test scenarios for the approval in accordance with regulatory and/or legal approval criteria), as is the simulation environment. At the same time, the test execution is started in various XIL and reprocessing environments and the necessary information is made available in a test data management system so that release is possible on the basis of this information.

The object is achieved according to the invention by a computer-implemented method for the automated testing and release of functions, in particular safety functions, integrated into an end-to-end process from data collection in the vehicle to updating the driving function back into the vehicle and/or virtual homologation of at least partially autonomous driving functions to be tested, a test unit, a computer program, and a computer-implemented data carrier.

An autonomous and/or partially autonomous vehicle contains a large number of control units. Each individual control unit and its network must be extensively tested during development and for homologation for their error-free operation in every traffic situation, especially critical situations.

However, because modern traffic environments are not only highly complex and dynamic, but also volatile (e.g., due to new traffic modalities, changes in building developments, or modified traffic regulations), there is no fixed point in time at which all relevant data can be collected in order to permanently find valid input parameters for the development of driving functions. Rather, it can be assumed that existing driving functions have to be continuously readjusted on the basis of new and changed functional requirements. Similarly, the qualitative further development of existing driving functions must be taken into account.

According to the invention, synthetic data sets, which serve to expand the training database, are therefore to be generated on the basis of the combination of newly collected and historical real data sets. This is done against the background of the subsequently necessary driving function tests. In order to have sufficient amounts of real data available for the corresponding validation, these real data can only be used to a limited extent for model training. For the further development process, real data are therefore enriched by synthetic data sets (e.g., by overlaying the scenes with rain or light and shadow). The synthesis methods used to generate these data play an important role here.

Various test procedures can be used for the driving situation test, such as, in particular, step-based testing, requirement-based testing, and/or scenario-based testing.

In scenario-based testing, the vehicle's driving style is analyzed in a traffic situation that is as close to reality as possible. The traffic situation aspects to be analyzed and their evaluation depend on the system to be tested. To this end, scenarios that can be described as an abstraction of a traffic situation are defined in the scenario-based testing of systems and system components for the autonomous guidance of a motor vehicle. Test cases can then again be executed for each scenario. A logical scenario here is the abstraction of a traffic situation with the road, the driving behavior, and the surrounding traffic without specifying concrete parameter values. By choosing concrete parameter values, the logical scenario becomes a concrete scenario. Such a concrete scenario corresponds to a single traffic situation in each case.

For the differentiation of traffic scenarios or scenarios in scenario-based testing, not only static parameters are used, such as, e.g., but not limited to surroundings, building development, or roadway width, but also in particular the driving behavior of the individual road users. The movements of the road users and thus the driving behavior are described by trajectories. Trajectories describe a path in both spatial and temporal directions. Movements of road users can be differentiated by parameters such as, e.g., speed.

Regardless of the test procedure chosen, the driving data and synthetic data are highly relevant for testing and adapting driving functions sufficiently well with simulations. In this regard, different driving situations/scenarios/use cases must be covered with corresponding safety standards. These are specified by SOTIF (ISO/PAS 21448), for example.

An application example is object recognition and thus an object recognition component in the vehicle. Such a component and/or driving function can be tested as to whether pedestrians are correctly recognized in various scenarios. If this is the case, the current model configuration can be retained. If there are deviations, the model is adjusted further until the formulated minimum performance is achieved.

A further example is the so-called cut-in scenario. In such a scenario, driving functions and driver assistance systems can be tested that maintain a necessary safety distance from other road users. The cut-in scenario can be described as a traffic situation in which a highly automated or autonomous vehicle is driving in a predetermined lane and another vehicle with a reduced speed compared to the ego vehicle cuts from another lane into the lane of the ego vehicle at a certain distance. The ego vehicle here refers to a vehicle under test (SUT).

In general the term "ego vehicle" can represent a virtual vehicle in the center of a simulation or a test. E.g. the vehicle for that a new function is to be developed or tested. Typically, one skilled in the art uses such to distinguish a central vehicle ("ego") from other vehicles or traffic participants (pedestrians, bicycles, etc.) that are usually called "fellows" or "fellow vehicles" that appear in a simulation or test and can interact or have an impact on the ego. For example, there may be several vehicles in a scenario in order to test a function of the ego vehicle but these fellow vehicles may not have the function to be tested, e.g. automatic braking systems.

The speed of the ego vehicle and the other vehicle, which is also called the fellow vehicle, is constant in this case. Because the speed of the ego vehicle is higher than that of the fellow vehicle, the ego vehicle must be slowed down to avoid a collision of the two vehicles.

In order to be able to measure these described examples in a meaningful way, it is necessary to integrate the test object into known simulation environments and to carry out so-called XIL tests, therefore, a mixture of model-, software- (SIL), and hardware-in-the-loop (HIL) tests. Due to the comparatively high cost of HIL tests, they can only be used at selected points in the process. However, in view of the cyber-physical nature of vehicle systems, they are essential in order to obtain meaningful results for later use in productive vehicle systems. Co-simulation approaches are particularly helpful here to ensure a targeted and consistent utilization of the severely limited test hardware in hybrid simulation scenarios. The more efficiently this splitting into test scenarios can be designed, the more greatly the entire product life cycle can be accelerated.

The virtual validation process is therefore designed as an iterative sequence of simulation, model training, and generation of key performance indicators (KPIs) for evaluating model performance, distributed across the individual driving function components and different XIL test categories.

What is important here is a continuous understanding of the existing basis of real data, which can be ensured by providing behavioral twins/digital twins for relevant fleet systems and other data sources involved (e.g., infrastructure elements). This is the only way to enable an adaptation/adjustment and/or further development of a driving function and its behavioral rules and to test them consistently so that the release of the function can occur via virtual homologation.

In the method of the invention, the term key performance indicator (KPI) or performance indicator refers to values (KPI values) which can be used to measure and/or determine the progress or degree of fulfillment with regard to important objectives or critical success factors after or during a simulation of at least partially autonomous vehicles. KPIs and/or KPI values allow an evaluation of the simulation and/or the simulation step for a test follow-up, so that testing can be carried out in a more targeted, resource-saving, and time-efficient manner.

A solution for the homologation is therefore required to be able to cover a complete end-to-end process formed of all subprocesses that follow one another chronologically and logically and are necessary to fulfill a specific customer need or a specific requirement and to be able to automate them accordingly. Of particular importance here is the introduction of virtual homologation, therefore, a release based on virtual and/or partially virtual simulation results and their evaluation. A distinction can be basically made here between homologation-neutral and homologation-relevant functions.

Such homologation relevance of driving function modifications must be guaranteed by vehicle manufacturers in particular. A supplementary procedure currently needs to be initiated in the case of a determination and categorization as homologation-relevant functions. It is clear that the required process speed can only be realized through a certain integration of test instances within the overall process. To this end, the corresponding interfaces between development and testing systems and the homologation processes must be created so that independent examiners from technical services can have direct access to the subsystems relevant to testing.

An at least partially automated driving function must minimize the risks to the safety of vehicle occupants in a vehicle and other road users in accordance with various regulations, such as, for example, a regulation for automated lane keeping systems (ALKS). This must be guaranteed at least at the level at which a competent, careful, and attentive human driver could minimize the risks. Such a risk balance must be assessed and verified. In order to consistently assess such risks, manufacturers in particular must define risk limits.

In general, there are two options for risk analysis: in absolute values and relative to a specific reference system or behavior. In the first case of a risk assessment in the form of absolute values, the probabilities of the assumed scenario, the probability of the underlying cause for the subsequent damage, and the possible dependencies between these two factors must be evaluated. In the latter case, representative scenarios, including their consequences for the system to be tested, are compared with a reference system in terms of damage probabilities and severity levels. Both approaches (absolute and relative risk assessment) must take into account whether the targeted risk threshold is a global threshold or whether there are individual subthresholds for individual scenarios or groups of scenarios.

At present, accidents on public roads are dominated by vehicles controlled by humans. This means that today the positive risk balance can be claimed solely by demonstrating that the system under test outperforms a human driver in, for example, a vehicle equipped with an advanced emergency braking system (AEBS) under road conditions that allow a strong deceleration of −0.85 G. The primary task of an AEBS is to prevent a rear-end collision in longitudinal traffic or to reduce the consequences of an accident by reducing the speed autonomously—without the driver's intervention. Thus, a risk balance must be calculated from the comparison between the degree of fulfillment of the requirements for homologation of the driving function with an exclusively human driver and with an activated driving function without a human driver.

A risk balance is positive if the driving function generates a greater safety, driving comfort, and/or energy efficiency than a human driver and negative if a human driver achieves a greater safety, driving comfort, and/or energy efficiency without the intervention of the driving function.

This makes the need and task of the invention clear, so that by making real driving data usable and transferring them to a suitable test and/or simulation system and integrating test instances into the test process, subsequent optimization and renewed release, therefore, virtual homologation of driving functions, are made possible.

To this end, the invention provides a computer-implemented method for the automated testing and release of functions, in particular safety functions, of a vehicle and/or virtual homologation of at least partially autonomous driving functions to be tested.

The test unit comprises components for the automated testing of functions, in particular safety functions, of a vehicle and/or homologation of at least partially autonomous driving functions to be tested.

According to a further aspect of the invention, a computer program is provided with a program code to carry out the method of the invention when the computer program is executed on a computer. According to a further aspect of the invention, a data carrier is provided with a program code of a computer program in order to carry out the method of the invention when the computer program is executed on a computer.

The features described herein of the computer-implemented method can be used for the automated testing and release of functions, in particular safety functions, of a vehicle and/or homologation of at least partially autonomous driving functions to be tested. Likewise, the test unit of the invention is suitable for carrying out a test readjustment of a large number of different devices or control units of, e.g., automobiles, utility vehicles, and/or commercial vehicles, ships, or aircraft.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

For a better understanding of the present invention and its advantages, reference is now made to the following description in conjunction with the accompanying drawings. The invention will be explained in more detail hereinbelow with reference to exemplary embodiments which are shown in the schematic illustrations of the drawings.

FIG. 5 shows a schematic diagram for the description of the optimization process according to the invention using KPI;

FIG. 6 shows a schematic diagram for the description of the use of behavioral twins according to the invention.

DETAILED DESCRIPTION

Figure 1:
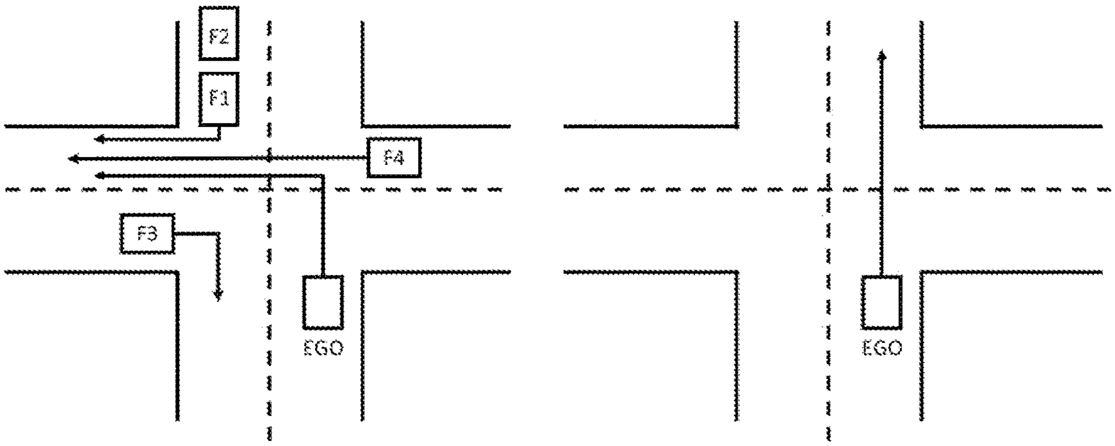
FIG. 1 shows a schematic diagram for the differentiation, according to the invention, of driving situations.

FIG. 1 describes two different scenarios S1 and S2. An intersection area is shown in each case. An ego vehicle (ego) is shown in both scenarios S1 and S2. In S1, the ego vehicle (ego) performs a turning maneuver. The ego vehicle is also the "subject under test" (SUT). Four fellow vehicles (F1 to F4) are involved in this case. In S2, the ego vehicle follows the route straight ahead without the involvement of fellow vehicles. There are therefore differences in the environmental parameters as well as driving situation parameters. The aim of the scenarios can be, e.g., the testing and simulation of adaptive cruise control.

The testing and simulation of such adaptive cruise control may require multiple test readjustments in order to obtain a valid test result. Driving data from real drives (fleet operation/regular driving) can be used to make a suitable selection of scenarios and to find a sufficiently good parameterization so that meaningful tests can be carried out. At least one and/or also a number of test executions generate many test results that can be evaluated automatically by automatically and/or manually selected KPIs. The evaluation via KPIs can accelerate homologation processes and make them possible in the first place, so that a prompt release for further use of the modified driving function in a real driving operation is realized. An example of an analysis using a KPI would be an evaluation of relationships in collision rates, such as, for example:

When at least 10 (N) test drives have been completed, the collision rate is examined in relation to the simulated test kilometers driven.

With an average of 2 (X) collisions (including near collisions) per 1000 km, only a limited release of the driving function is permitted.

If there are 3 (Y) collisions (including near collisions) per 1000 km, a release of the driving function is possible only under certain conditions.

If there are 4 (Z) collisions (including near collisions) per 1000 km, the current test process is aborted and further optimization of the driving function is required.

If all test drives were carried out by simulation with the first scenario and no (0, A) collision has occurred, a release can be considered. A degree of fulfillment of the requirements for the function to be tested and a release of the function can be specified by means of the evaluation using KPIs.

Figure 2:
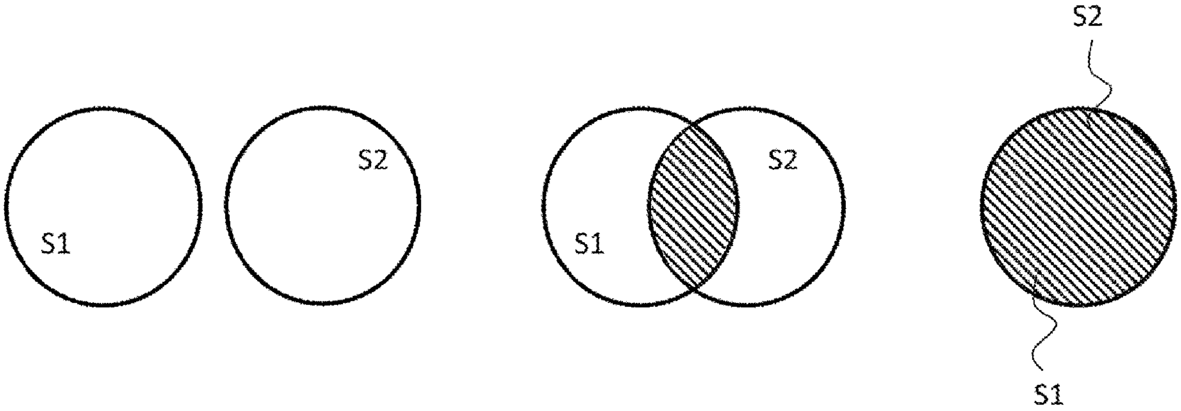
FIG. 2 shows a schematic diagram for the differentiation, according to the invention, of driving situations

FIG. 2 shows a schematic diagram for the differentiation, according to the invention, of driving situations/scenarios (S1 to Sn). According to FIG. 2, scenarios S1 and S2 can be completely different, in particular in relation to vehicle parameters and/or driving situation parameters and/or environmental parameters, have overlapping vehicle parameters and/or driving situation parameters and/or environmental parameters, or even be the same in relation to the respective parameters. The selection of suitable driving situations/scenarios plays a decisive role as does the choice of scenario parameterization, especially for the assertion of a sufficient homologation and thus for the release of a driving function. To this end, the extraction of relevant situations from the real data is important, so that parameterizations to be tested can be derived from them.

Figure 3:
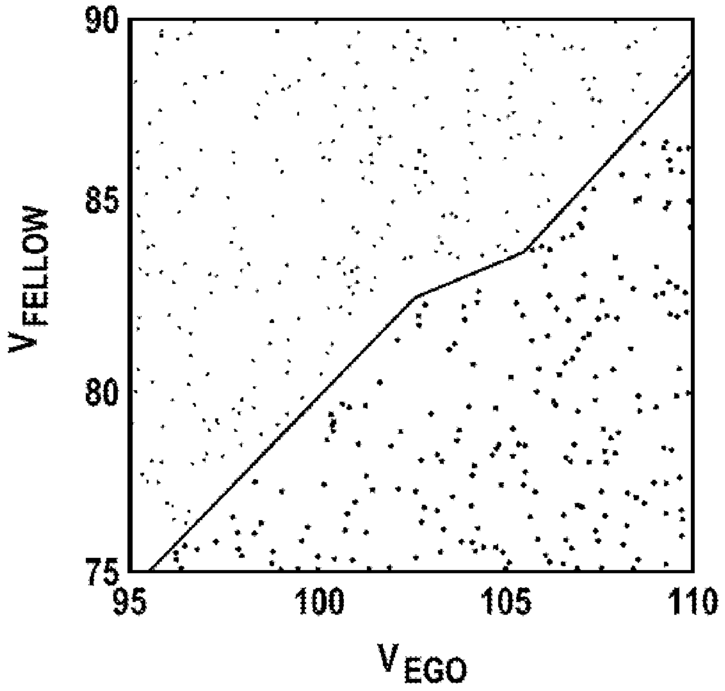
FIG. 3 shows a schematic view indicating a boundary between critical and noncritical test results.

FIG. 3 shows a function that indicates a boundary between critical and noncritical test results. The points shown are simulated test results. Alternatively, they can also be approximated test results.

The function shown is the safety objective function, which has a numerical value that has a minimum value when a safety distance between the ego vehicle (ego) and the further motor vehicle, the fellow vehicle, is ≥VFELLOW×0.55, has a maximum value when there is a collision between the ego vehicle (ego) and the further motor vehicle, and has a numerical value that is greater than the minimum value when the safety distance between the motor vehicle and the other motor vehicle is ≤VFELLOW×0.55. Results on a safety objective function can be monitored by KPIs over at least one and/or multiple test executions. The results of the evaluation can be used for the decision on the release of the modified driving function.

As an alternative to the safety objective function, a comfort objective function or an efficiency objective function can be simulated and/or approximated, for example, which has a numerical value that has a minimum value in the case of no change in the acceleration of the motor vehicle, has a maximum value when there is a collision between the ego vehicle (ego) and the further motor vehicle, and has a numerical value between the minimum value and the maximum value when there is a change in the acceleration of the ego vehicle (ego) as a function of the amount of the change in the acceleration. The majority of driving situation parameters, in particular the velocity VEGO of the ego vehicle (ego) and the velocity VFELLOW of the further vehicle, the fellow vehicle, are generated within the specified definition range, e.g., by a simulation.

Figure 4:
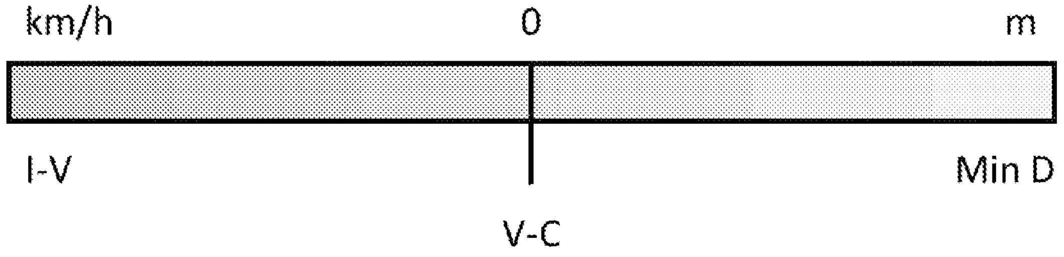
FIG. 4 shows a diagram of a key performance indicator (KPI) according to the invention.

FIG. 4 shows a diagram according to the invention of a key performance indicator (KPI). If the occurrence of a collision (V-C) is relevant for a scenario/driving situation and therein for a specific subject under test (SUT), a KPI (KPI) must be selected for this, such as one that evaluates the safety of the driving situation (Safety KPI). In particular, the KPI (KPI) can determine an impact velocity (I-V) in the event of a collision (V-C) or, should no collision (V-C) occur, specify a minimum distance (Min D) between the ego vehicle (ego) and a fellow vehicle. Especially in a cut-in scenario in which, e.g., adaptive cruise control is to be tested, these results are relevant for evaluating the scenario. For this purpose, a KPI value can be determined from the results obtained. If the KPI value falls below a defined threshold value, a further parameterization of the simulation can be found with the help of the determined KPI evaluation. However, if the threshold value for a KPI value is exceeded, a release of the driving function can be stipulated.

FIG. 5 shows a schematic diagram for a description, according to the invention, of the optimization process by means of KPI. For this purpose, a driving function is changed/optimized (C-F). The driving function is then simulated in a simulation environment (Sim). The results of the simulation (T-R) are then evaluated using at least one KPI (KPI-Eval) and a KPI value is determined. Depending on the results of the evaluation, a further optimization process is started or the test process is considered completed. Different parameters can be used during the simulation phase and/or different driving situations/scenarios can be used as the basis for the test.

FIG. 6 describes a schematic diagram for the description according to the invention of the use of behavioral twins (D_T, digital twins). A behavioral twin (D_T) describes the vehicle and/or the vehicle component and/or driving function so that adequate testing is made possible. Vehicle data (1) from at least one real vehicle (R_V), obtained in a real driving operation, wherein the vehicle data contain measured sensor values of the vehicle, are transferred to the behavioral twin (D_T). The at least one driving function is adapted (C-F) and tested using the behavioral twin (D_T) (2 to n), wherein XIL, SIL, and/or HIL tests can be used. Testing via the digital behavioral twin comprises at least one iteration. Each test/simulation (Sim) produces test results (T-R), which are then analyzed further. If in the key performance indicator evaluation (KPI-Eval) a threshold value of the KPI for evaluating the test/simulation and/or at least one simulation step exceeds and/or falls below a degree of fulfillment of requirements for homologation of the function, a release process can be started. This will end the iteration of changing and/or optimizing the function. After a release (m), the modified driving function is returned to the real vehicle (R_V) and used in the real driving operation.

Figure 7:
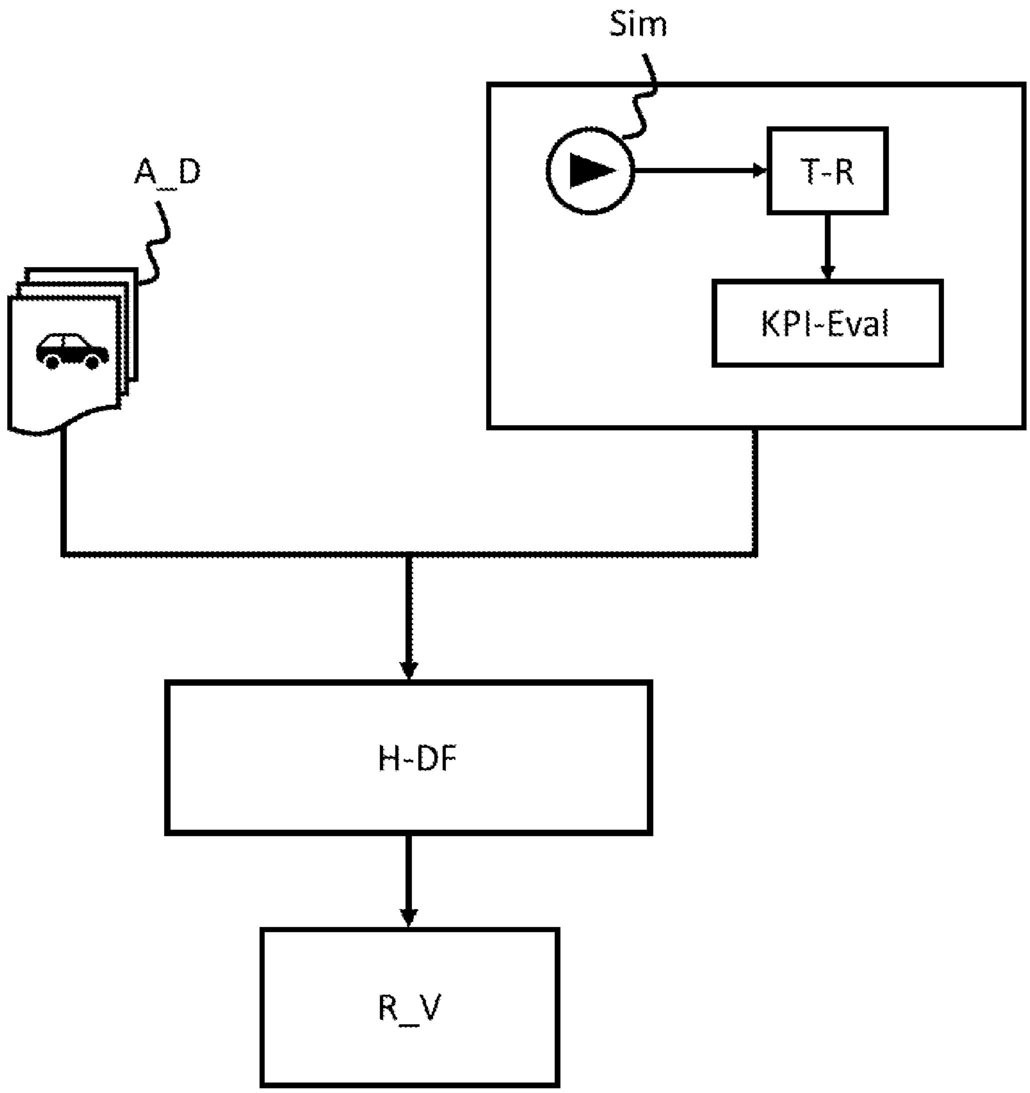
FIG. 7 shows a schematic diagram of a possible method of the invention for the automatic release.

FIG. 7 shows a schematic diagram of a possible method of the invention for the automatic release of a driving function. In a preferred embodiment, a risk balance is calculated for this purpose. Existing data (A_D) and the results from the KPI evaluation (KPI-Eval) are used as the basis for determining a risk balance. The KPI evaluation (KPI-Eval) contains results (T-R) of the simulation (Sim) and the corresponding evaluation with regard to a threshold value of the KPI. In this case, the KPIs can be set manually by the user/automatically by the test system and/or as a specification by regulations for a hazard/risk assessment.

As part of the virtual homologation (H-DF), the aforementioned data base is compiled and a risk balance is determined. The degree of fulfillment of requirements is indicated by a risk balance. The risk balance is positive if the driving function generates a higher level of safety, driving comfort, and/or energy efficiency than a human driver and negative if a human driver achieves a higher level of safety, driving comfort, and/or energy efficiency without the intervention of the driving function. If the risk balance is positive, the driving function to be tested is returned to the real vehicle (R_V).

In addition to the described embodiment of the release of a driving function, further embodiments according to the invention are included.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for the-automated testing and release of functions or safety functions integrated into an end-to-end process from data collection in at the vehicle to updating the functions driving function back into the vehicle and/or virtual homologation of at least partially autonomous driving functions to be tested, the method comprising:

- receiving vehicle data from at least one real vehicle, obtained in a real driving operation, wherein the vehicle data contain measured sensor values of the vehicle;
- extracting at least one parameter from the vehicle data;
- creating a simulation parameterized with the at least one extracted parameter;
- carrying out at least one test with the created simulation;
- evaluating the simulation results using at least one manually and/or automatically selected key performance indicator (KPI); and
- determining if the KPI falls below or exceeds a defined threshold value and optimizing and/or changing the at least partially autonomous driving functions to be tested and
- testing the at least partially autonomous driving functions by said carrying out the at least one test and said evaluating the simulation results; and
- releasing a modified function; and
- wherein a KPI value is determined by a KPI, which value is used to evaluate the current simulation and/or at least one simulation step, and a threshold value is defined for a KPI.

2. The computer-implemented method according to claim 1, wherein a function of a vehicle comprises functions for supporting a driver of the vehicle in certain driving situations and/or traffic situations, wherein the functions enable an increase in the safety and/or energy efficiency and/or driving comfort.

3. The computer-implemented method according to claim 1, wherein a test and/or a simulation is carried out virtually and/or partially virtually.

4. The computer-implemented method according to claim 1, wherein at least one test/simulation is determined by at least one parameter extracted from vehicle data, which is queried at the simulation runtime and/or at the end of the simulation, wherein the parameter comprises at least one of the following parameter characteristics:

a vehicle parameter having at least one vehicle setting and/or a sensor value that indicates a vehicle property;

an environmental parameter having at least one of the features: a number and/or a width of a lane and/or curves and/or road restrictions and/or an ambient temperature; and/or driving situation parameter describing a number and properties of moving objects, having at least one of the features: a number of road users and/or a number of lane changes in a traffic situation and/or a speed of the road users and/or type of transport or vehicle.

5. The computer-implemented method according to claim 1, wherein the defined threshold value of the KPI for evaluating the simulation and/or at least one simulation step indicates a degree of fulfillment of requirements for virtual homologation/release of the function.

6. The computer-implemented method according to claim 1, wherein a degree of fulfillment of requirements for virtual homologation/release of the function is indicated by a risk balance, which is positive if the driving function generates a greater safety, driving comfort, and/or energy efficiency than a human driver and negative if a human driver achieves a greater safety, driving comfort, and/or energy efficiency without the intervention of the driving function.

7. The computer-implemented method according to claim 1, wherein a digital behavioral twin of the real vehicle and/or driving function is generated with a simulation environment corresponding to the driving situations and/or traffic situations based on the extracted parameters in order to create a virtual and/or partial virtual simulation, so that a realistic testing and optimization of the function takes place in a time-efficient manner.

8. The computer-implemented method according to claim 1, wherein a digital behavioral twin is automatically created and parameterized according to the test task, therefore, the driving function to be tested formed of at least one software and/or electronic function and the necessary release relevant tests, which are derived from approval criteria for the driving function to be tested formed of at least one software and/or electronic function.

9. The computer-implemented method according to claim 1, wherein at least one setting of the function and/or at least one behavior rule of the function are adjusted iteratively during the optimization.

10. A computer program with program code to carry out the method according to claim 1 when the computer program is executed on a computer.

11. The computer-implemented method according to claim 1, wherein at least one test/simulation is determined by a plurality of parameters extracted from vehicle data, the plurality of parameters comprising:

a vehicle parameter having at least one vehicle setting and/or a sensor value that indicates a vehicle property;

an environmental parameter having at least one of the features: a number and/or a width of a lane and/or curves and/or road restrictions and/or an ambient temperature; and a driving situation parameter describing a number and properties of moving objects, having at least one of the features: a number of road users and/or a number of lane changes in a traffic situation and/or a speed of the road users and/or type of transport or vehicle.

12. The computer-implemented method according to claim 1, further comprising generating synthetic data sets based on a combination of newly collected real data sets and historical real data sets.

13. A non-transitory, computer-readable storage medium storing a computer program with program code to carry out the method according to claim 1 when the computer program is executed on a computer.

14. A test unit for the automated testing and release of functions integrated into an end-to-end process from data collection in a vehicle to updating the functions driving function back into the vehicle and/or virtual homologation of at least partially autonomous driving functions to be tested, the test unit being configured to perform the steps comprising:

receiving vehicle data from at least one real vehicle, obtained in a real driving operation, wherein the vehicle data contain measured sensor values of the vehicle;

extracting at least one parameter from the vehicle data;

creating a simulation parameterized with the at least one extracted parameter; carrying out at least one test with the created simulation;

evaluating the simulation results using at least one manually and/or automatically selected key performance indicator (KPI);

optimizing and/or changing the at least partially autonomous driving functions to be tested and testing the at least partially autonomous driving functions by said carrying out the at least one test and said evaluating the simulation results as long as the KPI falls below or exceeds a defined threshold value; and releasing a modified function; and wherein a KPI value is determined by a KPI, which value is used to evaluate the current simulation and/or at least one simulation step, and a threshold value is defined for a KPI.

15. The test unit according to claim 14, wherein the test unit comprises a control unit for which at least one function of a vehicle is tested by virtual and/or real tests.

* * * * *